United States Patent [19]

Mikulec

[11] Patent Number: 4,979,572

[45] Date of Patent: Dec. 25, 1990

[54] FIRE EXTINGUISHER INSTALLATION

[76] Inventor: Conrad S. Mikulec, 2400 NE. 26th St., Ft. Lauderdale, Fla. 33305

[21] Appl. No.: 325,691

[22] Filed: Mar. 20, 1989

Related U.S. Application Data

[63] Continuation-in-part of Ser. No. 4,670, Jan. 20, 1987, Pat. No. 4,813,487.

[51] Int. Cl.[5] .......................... A62C 35/02; F16K 17/38; B05B 1/26; G08B 21/00

[52] U.S. Cl. .......................................... 169/65; 169/26; 169/58; 169/56; 169/19; 169/23; 137/79; 340/540; 239/524

[58] Field of Search ......................... 169/65, 26, 19, 57, 169/59, 54, DIG. 3, 23, 56, 58, 70; 137/79, 72; 340/590, 690, 540, 531, 691; 239/518, 524

[56] References Cited

U.S. PATENT DOCUMENTS

| | | | |
|---|---|---|---|
| 1,055,803 | 3/1913 | Runnion | 137/79 X |
| 1,072,938 | 9/1913 | Gillen | 137/79 |
| 3,653,443 | 4/1972 | Dockery | 169/65 X |
| 3,747,618 | 7/1973 | Boes | 169/19 X |
| 3,772,499 | 11/1973 | Fritzche | 169/65 X |
| 3,824,374 | 7/1974 | Mayher | 169/65 X |
| 3,866,687 | 2/1975 | Banner | 169/65 X |
| 4,313,501 | 2/1982 | Eckert | 169/57 X |
| 4,356,870 | 11/1982 | Gaylord et al. | 169/65 |
| 4,580,638 | 4/1986 | Jones et al. | 169/65 X |
| 4,675,541 | 6/1987 | Peters et al. | 169/65 X |
| 4,813,487 | 3/1989 | Mikulec | 169/65 |
| 4,830,116 | 5/1989 | Walden et al. | 169/65 |
| 4,834,188 | 5/1989 | Silverman | 169/65 |

FOREIGN PATENT DOCUMENTS

| | | | |
|---|---|---|---|
| 2242846 | 5/1975 | France | 169/19 |

*Primary Examiner*—Sherman D. Basinger
*Assistant Examiner*—James M. Kannofsky

[57] ABSTRACT

An automatically activated fire extinguishing device for a stove. The device is installable in a hood over the stove and has a compact design which substantially hides portions of the device from normal viewing. The invention also includes an automatic stove shut-off which shuts off the electricity and/or gas to the stove in the event of a fire.

10 Claims, 6 Drawing Sheets

FIRE EXTINGUISHER INSTALLATIONREFERENCE TO RELATED APPLICATION

This is a continuation-in-part of application Ser. No. 07/004,670, filed Jan. 20, 1987, now U.S. Pat. No. 4,813,487.

BACKGROUND OF THE INVENTION

The use of automatically activated fire extinguishing devices for cooking stoves and the like is known. Such devices provide a source of fire extinguishing compound to be released on to a stove surface in the event of a fire which occurs during use of the appliance. Such prior art devices, however, are relatively bulky, the fire extinguishing compound generally being stored in a container at a location remote from the stove with a piping arrangement connecting the container with a spraying device for dispensing the compound onto the stove. The spraying device is normally located above the cooking surface, and the fire extinguishing compound is conveyed from the container, through the piping and out through the spraying device to put out the fire.

These prior art devices have the disadvantage of requiring on-site installation time and expense over and above that required for the stove itself. Moreover, as the distance between the container and the spraying device (e.g. nozzles) is increased, more propellant is required to transport the fire extinguishing compound, which in turn requires a larger container for storage of the propellant along with the fire extinguishing compound. In addition to the unsightly appearance of the fire extinguisher container and the piping from the container to the stove, the nozzles generally protrude down from above the stove and may interfere with the activities of the stove operator.

The fire extinguishing device must also have a triggering mechanism positioned for sensing excessive heat from a stove fire, and thus the triggering mechanism is located near the cooking surface. Because of this location requirement, the triggering mechanism, like the nozzles, is readily visible and results in an unattractive appearance.

Prior art automatic fire extinguishing installations also may include an automatic shut-off arrangement for shutting off either the electricity or gas to the stove (depending on the stove type) upon detection of a fire. Known shut-off arrangements are generally complex and can only be installed by an electrician or other professional, thus they also contribute to on-site installation time and expense.

There is thus a need in the art for a fire extinguishing device which is unobstrusive in appearance, is relatively lightweight and streamlined, and does not require a prohibitive amount of on-site installation time and expense. There is also a need in the art for an automatic shut-off arrangement for disconnecting the power and/or fuel source of the stove which is simple in design and does not require expert assistance for installation.

DISCLOSURE OF THE INVENTION

It is accordingly an object of the invention to provide a fire extinguishing device for a stove which can be easily mounted and hidden from view.

It is another object of the invention to provide a device, as above, in which the fire extinguisher container, triggering mechanism and nozzles present no hindrance to the operation of the appliance by the stove operator.

It is a further object of the invention to provide a fire extinguishing device which, when activated, automatically shuts off all sources of power and/or fuel, i.e. electric and/or gas to the stove.

It is yet another object of the invention to provide a device, as above, which does not require an extensive amount of time and expense for on-site installation.

These and additional objects are attained by the present invention which relates to an apparatus for extinguishing a fire on a stove, the stove including a hood, the apparatus comprising (a) a container containing a fire extinguishing compound, the container including an opening and a means for propelling the compound through the opening, (b) a valve positioned in the opening and being operable to allow the fire extinguishing compound to exit through the opening, (c) at least one nozzle in fluid communication with the valve to receive the fire extinguishing compound exiting through the opening, the nozzle directing the fire extinguishing compound for extinguishing a fire on the stove, (d) valve opening means contacting the valve, (e) a shut-off means in communication with stove power and/or fuel sources for shutting off electrical power and/or gas to the stove, and (f) a heat sensitive triggering means for triggering the valve opening means and the shut off means upon detection of the fire.

BRIEF DESCRIPTION OF THE DRAWINGS

For a full understanding of the invention, the following detailed description should be read in conjunction with the drawings, wherein.

DETAILED DESCRIPTION OF THE PREFERRED EMBODIMENTS

The preferred exemplary embodiments of the invention are illustrated in FIGS. 1–10, wherein like numerals represent like parts.

Figure 1:
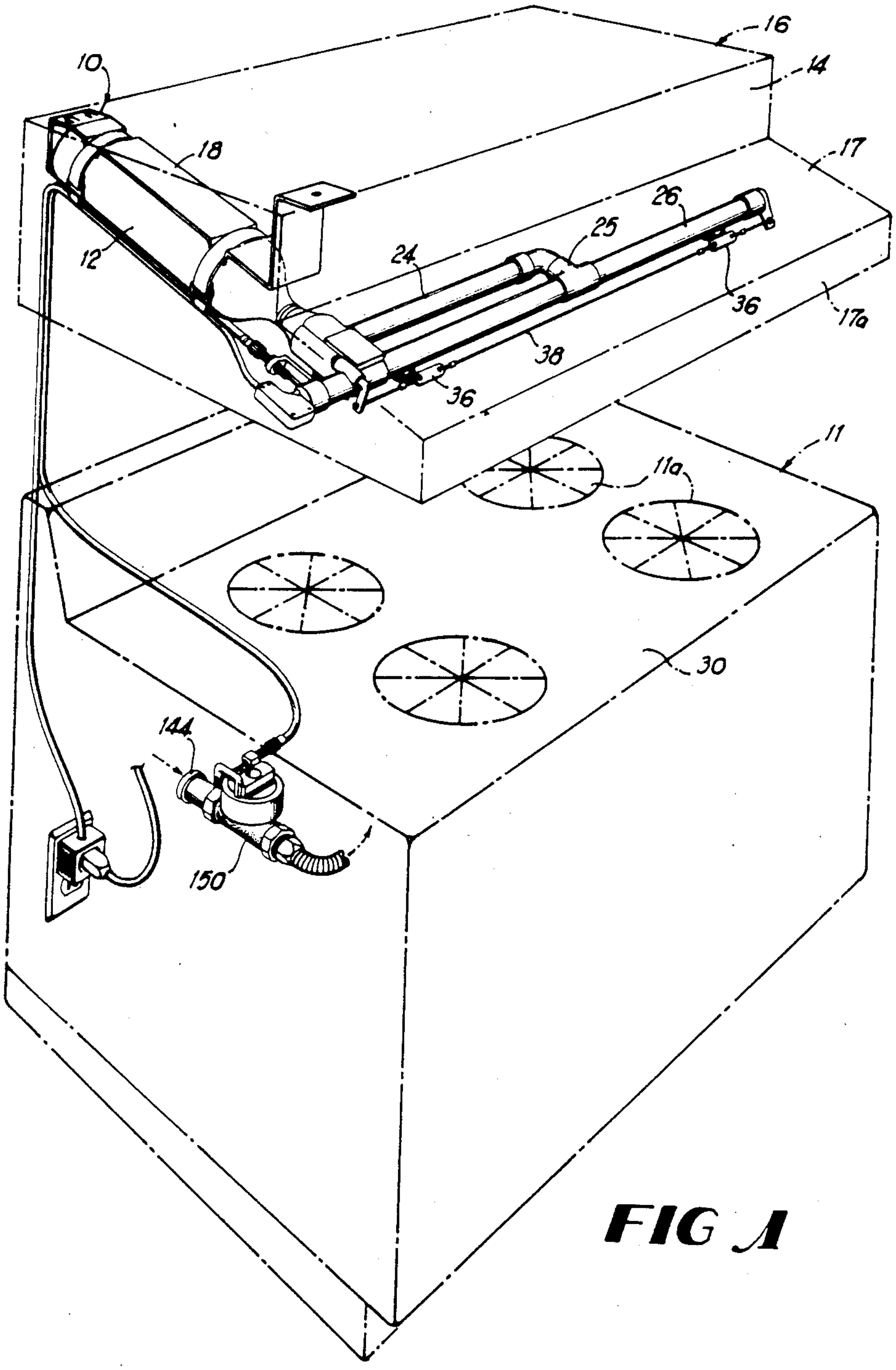
FIG. 1 is a perspective view of the fire extinguishing apparatus of the present invention used in conjunction with a hooded stove, the stove and hood being shown in phantom lines.

A stove 11 is illustrated in FIG. 1 in phantom lines, in which a fire extinguishing apparatus is indicated generally by the number 10. The apparatus is located above the stove 11, the stove 11 having electric or gas burners 11. A container 12, which is preferably a pressure vessel, holds a quantity of fire extinguishing compound and an appropriate propellant, and is secured to a generally horizontal portion 14 of a stove hood 16 by means of a bracket 18. The hood 16 includes a tilted portion 17 and a skirt 17*a* which is substantially vertical. The bracket 18 tilts the container 12 at an angle to the horizontal, which can be between approximately 14° and 45° and preferably is about 14°. This tilting facilitates both the discharge of the fire extinguishing compound from the container, and the positioning of the apparatus such that it is substantially hidden from view.

Figure 3:
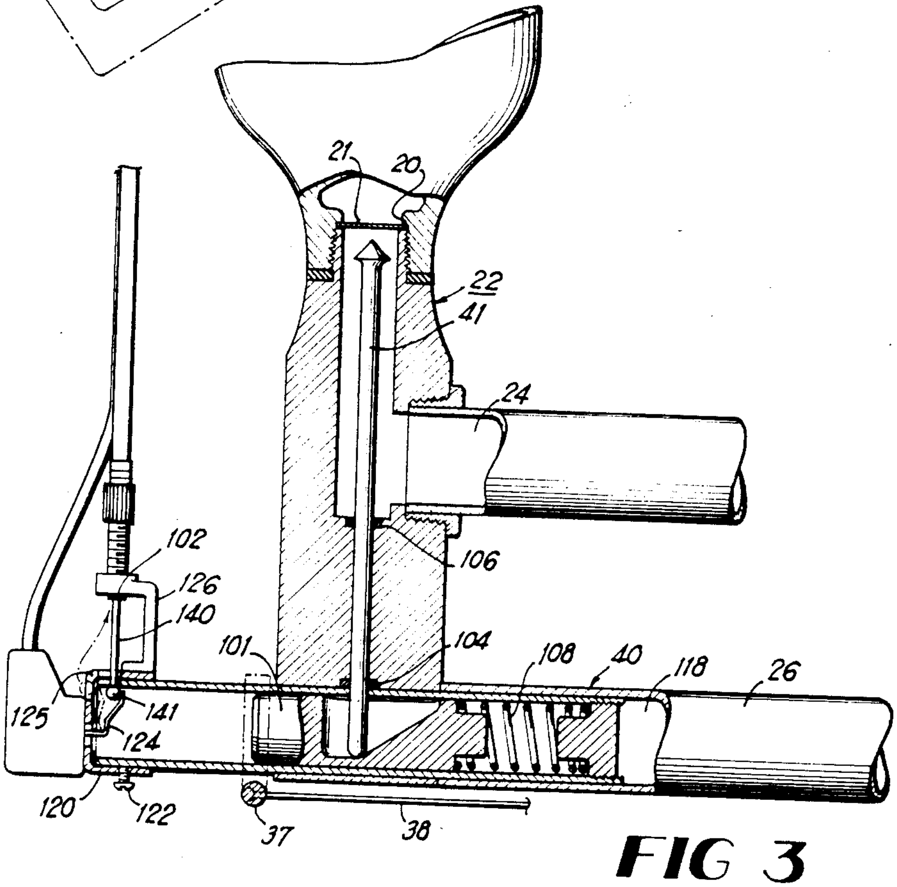
FIG. 3 is a cross-sectional view of the triggering and valve opening mechanisms of the invention.

As shown in FIGS. 1 and 3, the container 12 has an opening 20 through which the fire extinguishing compound is released. A seal 21 is provided over the opening to retain the fire extinguishing compound prior to use. A valve means 22 positioned in the opening punctures the seal 21 to release the fire extinguishing compound when the apparatus 10 is activated. Tube 24 attached to the side of valve 22 conveys fire extinguishing compound from the valve outlet 25 to a header 26 when the valve is open. Secured to the header 26 are one or more nozzles 28 (FIG. 7) which direct the fire extinguishing compound to the stove surface 30 to extinguish a fire thereon.

Fusible links 36, trigger 37 and wires 38 function as a heat sensitive triggering means for triggering the valve opening mechanism 40, such that a rod 41 of valve 22 is pushed upward in an axial direction when one or more of the fusible links 36 break due to heat from a fire.

Figure 2:
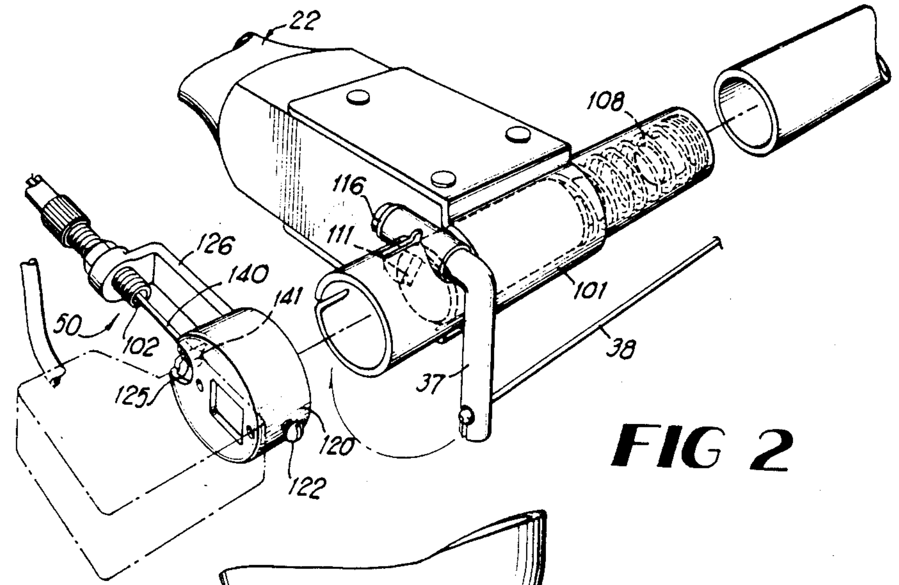
FIG. 2 is an exploded perspective view of the triggering and valve opening mechanisms of the invention.

The detailed structure of the valve 22 and the valve opening mechanism 40 are shown in FIG. 3 and the heat sensitive triggering means is shown in FIGS. 2 and 3 where references to direction are to be construed as the individual Figures are viewed. A ramp 100 mounted on a plunger 101 contacts rod 41 and slides along the ramp 100 when the ramp is moved axially in header 26. The rod 41 has a sharp pointed distal end. Movement of the ramp 100 induces the rod 41 to move axially upwardly, as shown in FIG. 3, and to thereby puncture the seal 21. O-rings 104 and 106 provide a sealing means for valve 22 and rod 41 against leakage of the fire extinguishing compound into the triggering mechanism. The opening 20 which allows passage of the fire extinguishing compound to the nozzles 28 extends through the valve 22 and into tube 24.

The ramp 100 and plunger 101 are biased leftwardly by spring 108 as viewed in FIG. 2. Movement of the plunger 101 in the leftward direction is prevented by trigger 37 which has a plug 111 extending therefrom. Plug 111 contacts the plunger 101 and maintains the spring 108 in compression. Fusible links 36 and wires 38 maintain the trigger 37 with its plug 111 in the downward position exerting pressure against the plunger 101. A stop 118 is provided at the right side of the spring 108 both for support of the spring 108 and to seal off the valve opening mechanism 40 from the fire extinguishing compound passing through header 26.

In operation, the excess heat from a stove fire causes one or more of the fusible links 36 to melt and break apart, releasing the tension on wire 38 which holds the trigger 37 and plug 111 against the plunger 101. The trigger 37 rotates in a clockwise direction due to pressure exerted by plunger 101 which is extended leftwardly as potential energy from spring 108 is released. The trigger plug 111 rotates upwardly into an elongated slot 116 as the plunger 101 moves forward. When ramp 100 moves in the leftward direction with the plunger 101, rod 41 is forced axially upwardly until it punctures seal 21. Fire extinguishing compound under pressure is then forced out of the container to tube 24 and ultimately through the nozzles 28 via the header 26.

In addition to initiating the expulsion of the fire extinguishing compound on to the burner surface, the leftward motion of the plunger 101 operates the gas and/or electrical shut-off mechanism so that the fuel source to the stove is discontinued during the fire. The movement of the plunger 101 activates a tension controlled shut-off valve activator 50. The activator 50 has a casing 120 which caps the end of the header 26 closest to the valve opening mechanism 40. The casing 120 is maintained on the end of the header 26 via a screw 122 or like securing means. A slot 125 is formed in the wall of the casing through which a tension cable 140 is passed. The slot 125 is narrow at the end closest to the header 26 and widens as it extends away from the header. A knurl 141 is disposed on the distal end of the tension cable 140. The cable 140 extends into the casing 120 through the narrow portion of the slot 125. The casing 120 retains the cable 140 therein since the knurl 141 is larger than the narrow portion of the slot opening 125. A flexible switch arm 124 is located within the casing 120 and is situated such that it extends around the knurl 141 disposed at the end of the tension cable 140 as it rests within the narrow portion of the slot 125.

Referring still to FIG. 3, when the heat sensitive triggering means is activated, the plunger 101 is pushed leftwardly by spring 108, as viewed in FIG. 3 which decompresses when the fusible links 36 are broken. Pressure is exerted on the flexible switch arm 124 by the plunger 101 as it is pushed forward. The switch arm 124 pushes the knurl 141 and connected cable 140 leftwardly into the wider portion of slot 125 and the cable 140 is released from the casing due to release of tension as the knurl 141 exits the slot 125. A guide bracket 126 adjacent the casing 120 limits the release of the cable 140 by providing a catch 102 through which the knurl 141 does may not pass. The cable 140 is held within a cable sleeve 132 and connected at the bracket 126 via a bracket sleeve 128. A tension regulator 130 is mounted at each end of the cable sleeve 132 so that the tension of the cable can be adjusted. The cable wire 140 is connected at its opposite end to either a gas shut-off mechanism or an electrical shut-off mechanism. Releasing the tension causes the mechanism to activate, thus shutting-off the fuel source.

FIGS. 1 and 4–6 show the fire extinguishing apparatus having a shut-off mechanism to turn off a gas valve. In the operation of gas stoves, generally a standard ball type gas valve 150 is used to supply gas to the burners 11*a* from a conventional gas line 144. A ball-type gas valve 150 is a common apparatus comprised of a connecting pipe 152 and a ball having a cylindrical hole drilled therein (not shown). The ball sits inside the valve and is rotatable within the connecting pipe 152 such the cylindrical aperture is either at right angles to or in alignment with the interior channel of connecting pipe 152. When the cylindrical aperture is aligned with the connecting pipe, gas is supplied to the burners 11*a*. When the cylindrical aperture is at right angles with the connecting pipe 152 the gas source is shut off.

A valve stem 158 having opposing flat sides and opposing threaded sides extends from the internal ball and is turned to rotate the ball within the cylinder, normally by manual valve lever. Stop lugs 159, positioned on the outer casing of the connecting pipe 152, normally prevent the valve stem 168 from being turned more than 90° by the valve lever. In the disclosed invention, however, the manual valve lever is eliminated from the conventional ball type gas valve 150. The gas shut-off valve of the disclosed invention replaces the manual lever and is used to manipulate the valve stem 158 of the conventional system. The gas shut-off valve is connected to the tension cable 140 such that it is activated upon the release of the cables, thereby shutting off the gas source during a fire.

Initially, the ball type gas valve in the operation of the fire extinguishing apparatus, is set to the "on" position and delivers gas to the burners 11*a*. An outer casing 160 engages the valve by inserting the stop lugs 159 in slots 162 disposed within the casing 160. This holds the outer casing 160 in a stationary position over the ball-type gas valve 150. The casing 160 is generally hollow and contains within it a spool 164 loaded by a spring 163. Depression 161 contained within the casing 160 is used to maintain the lower distal end of the spring 163 in fixed relation to the outer casing 160.

Figure 4:
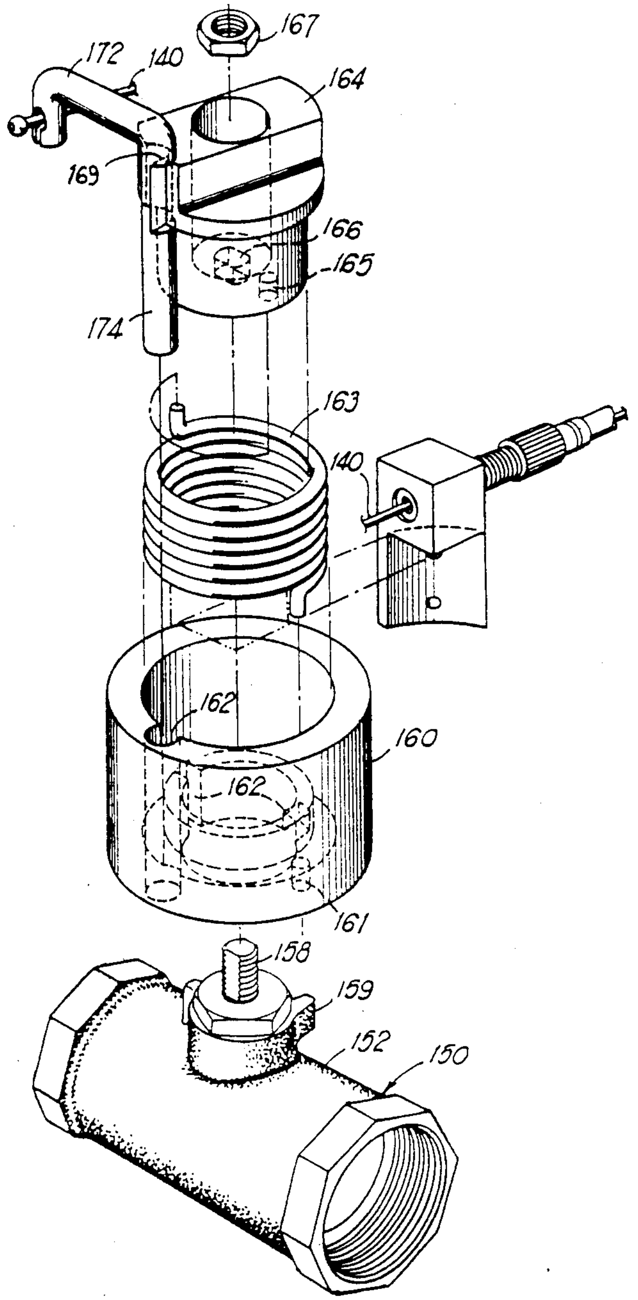
FIG. 4 is an exploded perspective view of a gas shut-off valve mechanism used in conjunction with the fire extinguishing apparatus.
Figure 5:
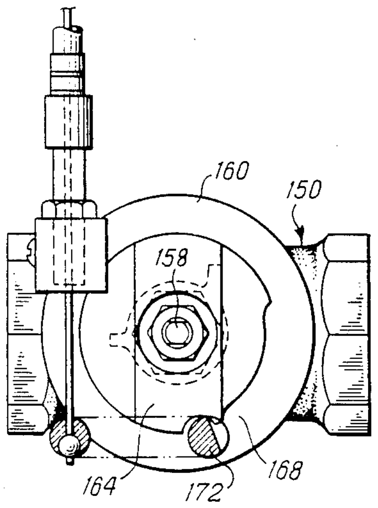
FIG. 5 is a top plan view of the gas shut-off valve mechanism shown in FIG. 4, where the gas valve is in the open position and the gas valve shut-off mechanism has not been activated.
Figure 6:
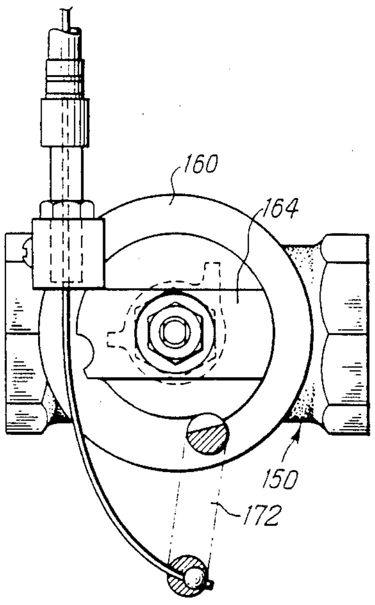
FIG. 6 is a top plan view of the gas shut-off valve mechanism shown in FIG. 4, where the gas shut-off valve has been activated and the gas valve is in the closed position.

Referring now to FIGS. 4, 5 and 6 the spring-loaded spool 164 is inserted into the casing 160. The lower portion of the spool 164 fits concentrically within the hollow interior of the casing 160 and has a depression 165 within its lower portion for inserting and maintaining the upper distal end of the spring 163 therein. The spool 164 has an opening 166 which engages the valve stem 158. A nut 167 is inserted within the hollow portion of the spool and engages the top of the valve stem to hold the spool from its top portion over the casing 160. The spool 164 is then loaded by counter clockwise rotation while the spring is engaged by depression 161 at its lower end and by depression 165 at its upper end. Rotation of the spool 164 while the spring is engaged causes the spring to attain a state of potential energy. A lever 172 held by the tension cable 140 prevents the spool 164 from returning to its resting state. The lever 172, having a stem portion 174, is inserted into an outer depression 169 in the spool 164 and into a second depression 162 in the outer casing 160. The stem portion 174 has a flat edge which engages a projection extending from the edges of slot 168 formed along the rim of the upper edge of the spool 164. The lever 172 retains the spool 164 in the cocked position as the tension cable 140 pulls the lever 172 in a clockwise direction and maintains the lever in a stationary position.

This stationary position is maintained by the flat portion of the stem abutting the ridges formed at the ends of slot 168 formed along the outer edge of the spool 164. As tension in the cable 140 is released by the melting or breaking of the fusible link 38 and operation of the valve opening mechanism 40 and trigger 37, the lever 172 is released and the spring 163 unloads within the casing 160 in the clockwise direction, turning the spool 164 in the same clockwise direction. As the spool 164 turns, the valve stem 158 is rotated 90° which closes the ball valve within the connecting pipe 152 effectively closing the gas line. Simultaneously, the lever 172 turns in the counterclockwise direction and rolls within the slot 168 along the rim of the spool until the second edge of the slot 168 again meets the flat edge of the lever stem 174. This prevents the spool 164 from turning the valve stem greater than 90° and leaking gas to the stove after activation of the shut-off mechanism during a fire.

Figure 7:
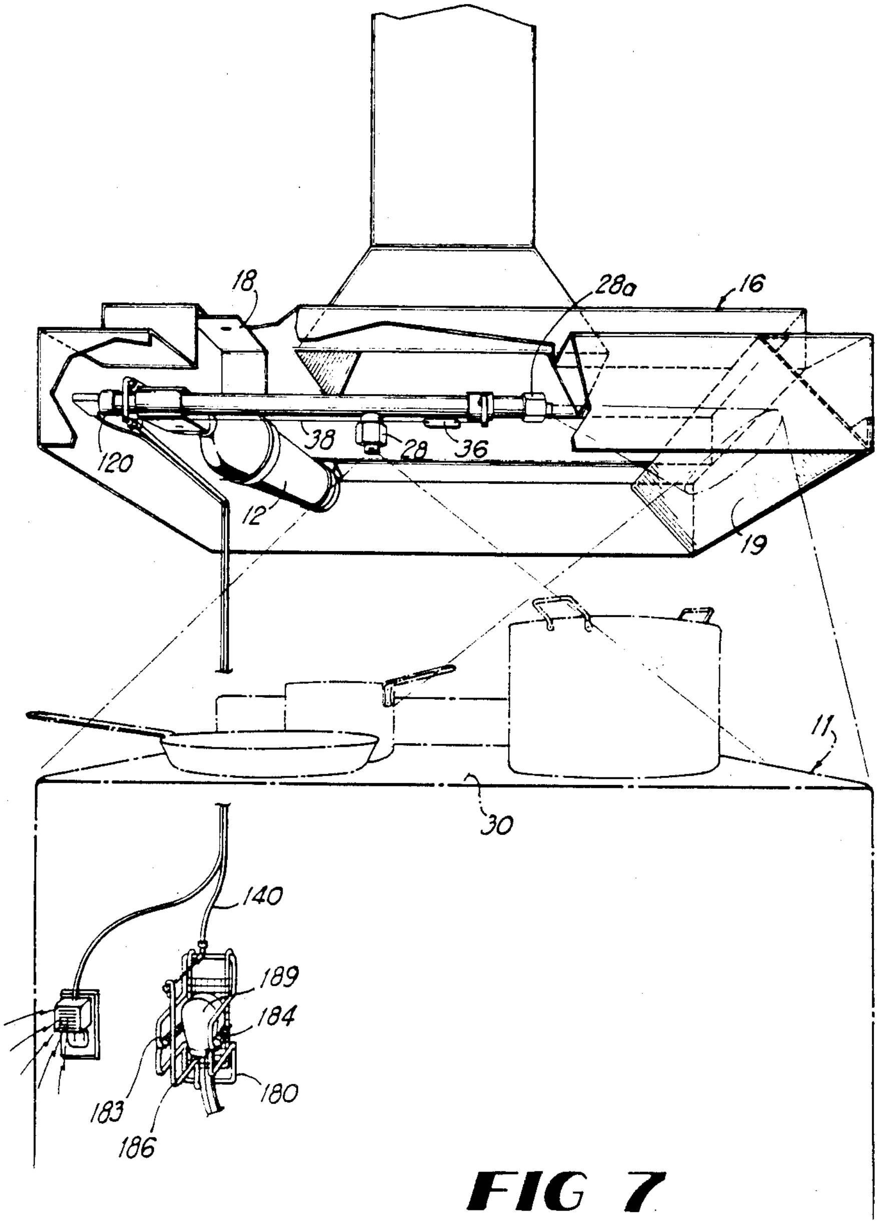
FIG. 7 is a perspective view of an alternate embodiment of the fire extinguishing apparatus shown in FIG. 1 having electrical shut-off mechanisms and a deflection plate to increase dispersion of fire extinguishing material over the cooking surface.
Figure 8:
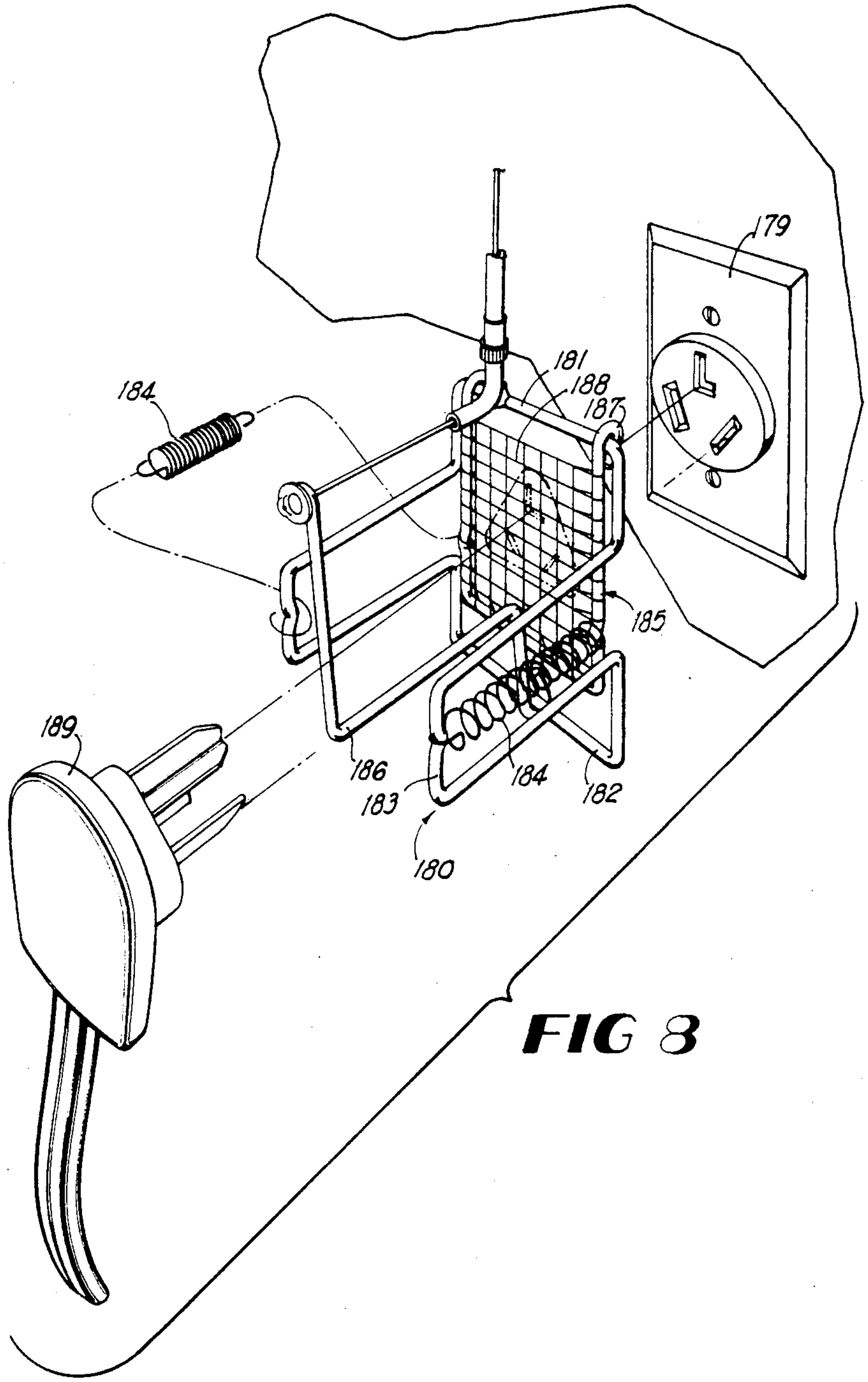
FIG. 8 is a perspective view of the electrical shut-off mechanism used in conjunction with the fire extinguishing apParatus in FIG. 7.

Electricity to the stove is shut-off during a fire by the apparatus shown in FIG. 7 and 8. This mechanism disengages the stove plug 189 from the electrical outlet 179 upon release of the tension cable 140. The electrical outlet 179 is covered by a frame 180. The frame 180 has a top bar 181, a bottom bar 182, parallel to the top bar and sides 183 which extend perpendicularly from the top and bottom bars. A trap door 185 is hingedly connected to the top bar 181 of frame 180. The trap door is biased to the open horizontal position due to springs 184 connecting the bottom of the trap door 185 to the sides 183 of the frame. The stove plug 189 is inserted through the trap door 185 to the outlet 179. The trap door 185 includes a frame 187 covered by a net like material 188 which contains holes for the male prongs of a plug 189. A latch 186 maintains the trap door 185 in the closed position by contacting the bottom edge of the trap door. The latch 186 is rotatably connected about the bottom portion of the frame 182 and is supported in the upright position by the tension cable 140 connected at its distal end. When the cable 140 is relaxed, the latch 186 rotates in a counterclockwise direction thereby losing contact with the trap door 185. The springs 184 pull the trap door 185 to the open position. The plug 189 is, accordingly, disengaged from the electrical outlet 179 as the trap door 185 swings upwardly. Again, as with the prior embodiment, the tension cable 140 which releases the latch 186 is relaxed only when the fusible link melts and is broken during a fire and the triggering mechanism 40 is released.

Figure 9:
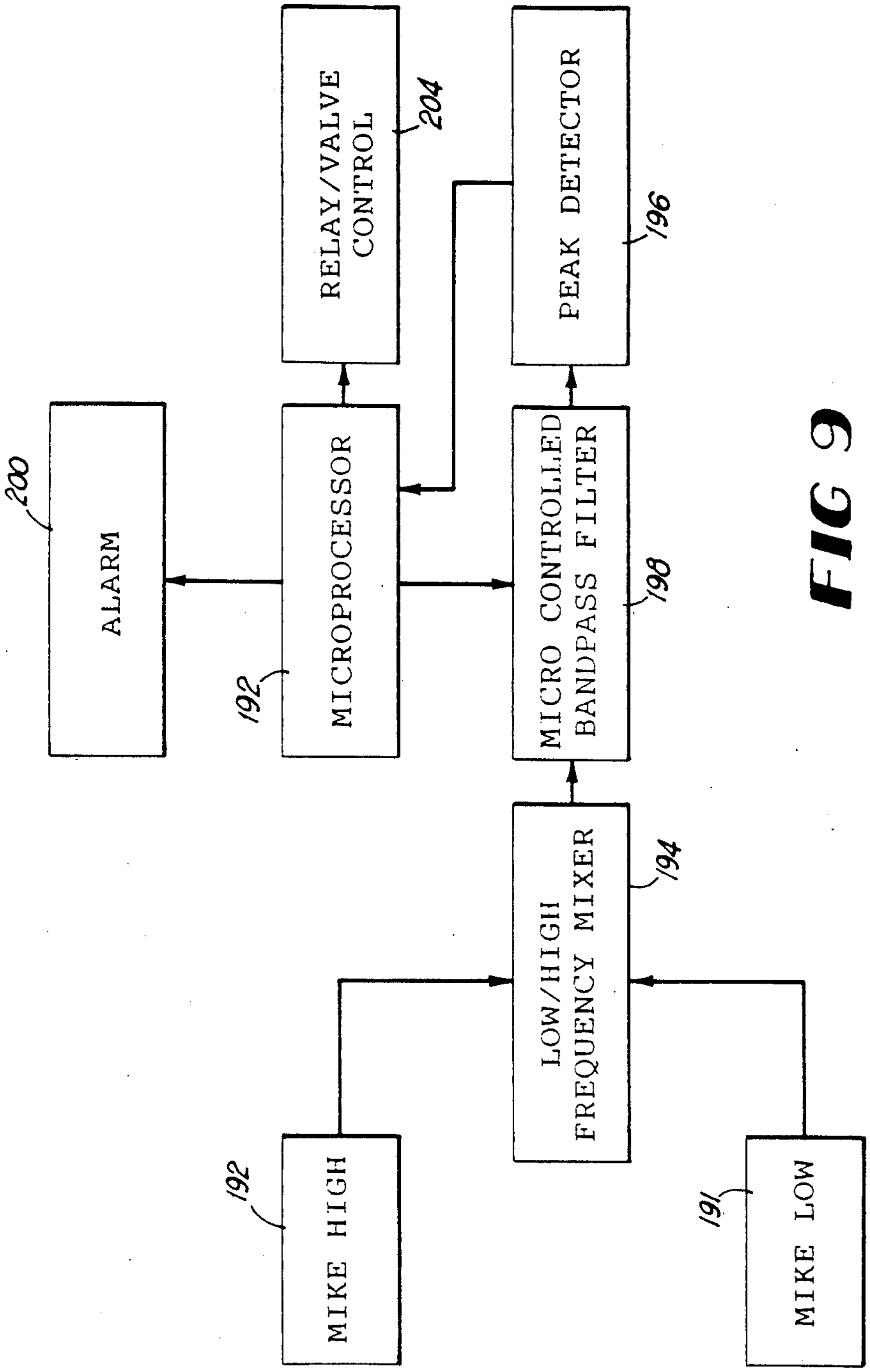
FIG. 9 is a schematic view of a sound activated electrical shut-off mechanism and alarm used in conjunction with the fire extinguishing apparatus.
Figure 10:
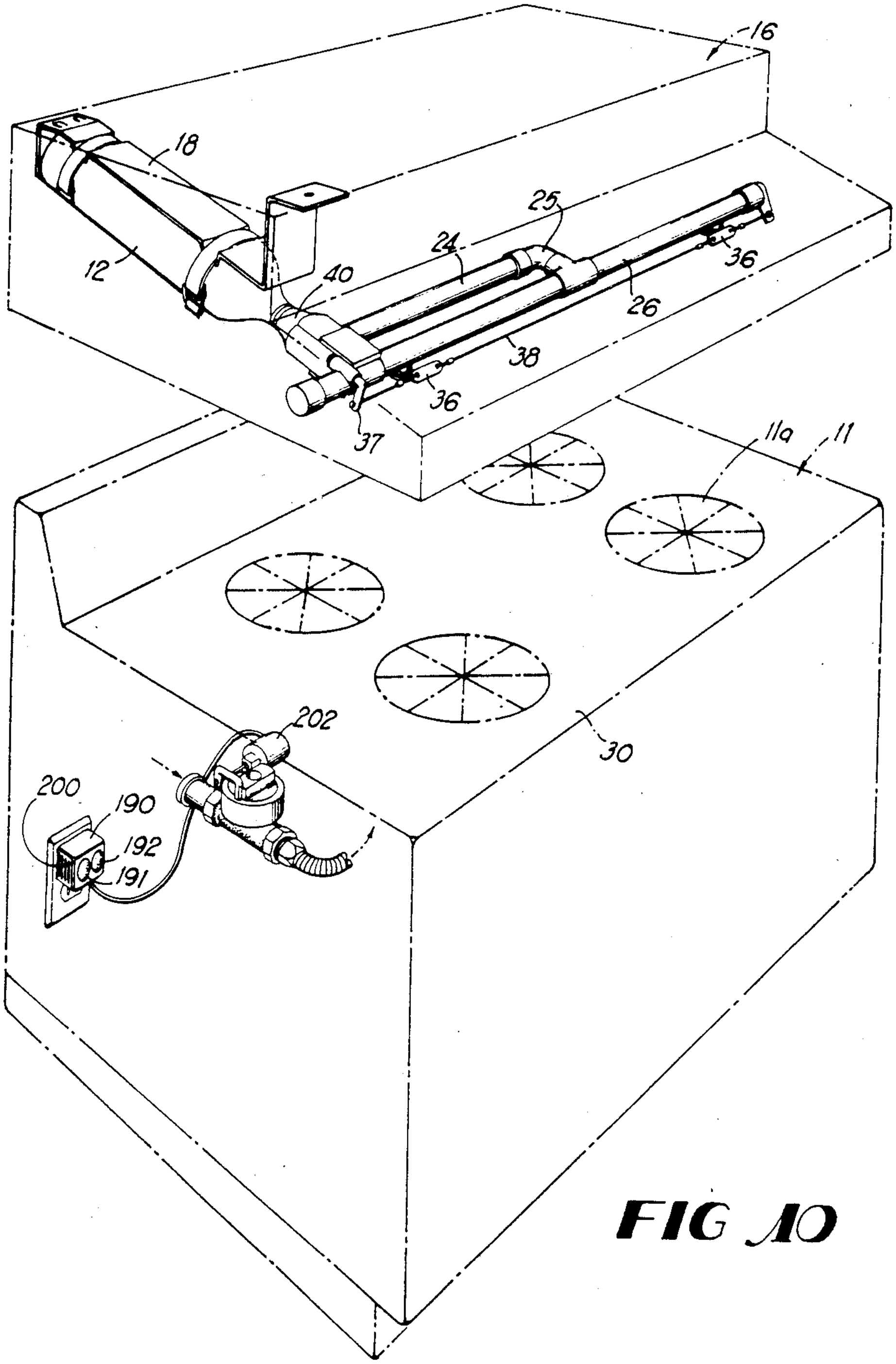
FIG. 10 is a perspective view of a stove utilizing the sound activated shut-off mechanism and alarm for use in connection with the fire extinguishing apparatus

In addition to the mechanical shut-off devices shown, a sound activated mechanism is also used to disconnect the power supply to the stove. The sound activated mechanism is shown in FIG. 9 demonstrating a schematic view of its operation and in FIG. 10 showing a physical device. Two microphones, one low frequency microphone 191 and one high frequency microphone 192, enclosed in a housing 190 pick-up the unique sound signature of the fire extinguishing compound as it exits through the nozzles 28 generating a sound pressure wave. The sounds generated by the nozzles 28 are dominated by several distinct frequency components. The low frequency microphone and high frequency microphone pick-up low and high frequency components, respectively, of the line spectrum for the sound pressure wave and ambient noise.

The sound pressure wave generated by passage of the fire extinguishing compound through the nozzles 28 as well as ambient noise are picked up by the microphones and mixed in a balanced modulator 194 with a variable ultrasonic signal in order to translate the audio frequency noise spectrum upward to the band pass filter frequency 198. Varying the oscillator frequency causes different spectral components to appear at the filter output.

The fixed band width of the filter provides an electrical output representative of the acoustical characteristic of the expended fire extinguishing compound. This signal is transmitted to a peak detector 196 that is controlled by a microprocessor 197. The microprocessor monitors the increase in the signal from the band pass filter over time, and, when a threshold value is exceeded, activates an alarm 200 and either opens a relay switch 204 to break the electrical circuit to the stove or to shut-off the gas valve controlling the flow of gas to the gas burners 11a by operation of a solenoid gas valve 202.

The sound activated mechanism can be used in conjunction with the previously described mechanical mechanisms as well as independently to shut-off the fuel supply to the stove. Most gas stoves also use an electrical current for lights and clocks and other accessories and require at least one shut-off mechanism for each power source. The sound activated cut-off mechanism is particularly useful for series activation of several stoves in an industrial setting. A fire on one stove activates its alarm and generates a sound, which in turn activates the adjacent stove which activates the next stove on the line, thus, stoves remote from the immediate distress area are turned off during a fire. Thus, the fuel source can be deactivated without releasing fire extinguishing compound.

FIG. 7 shows an alternate embodiment of the stove shown in FIG. 1. This embodiment is directed to the coverage of fire extinguishinq compound over the stove top surface 30. The fire extinguishing apparatus has two nozzles 28 which spray the fire extinguishing compound over the stove surface. However, the header 26 which receives the compound and delivers it to the nozzles 28 is significantly shorter than in the embodiment shown in FIG. 1. One nozzle 28 is pointed downwardly to the burner surface 30 while the other nozzle 28a is pointed toward a deflection plate 19 which hangs downwardly at an angle from the hood 16 of the stove 10. The second nozzle 28a releases the fire extinguishing compound onto the deflection plate 19 which redirects it to the stove surface 30 causing a wider dispersion of the compound. Thus, more of the surface area of the stove directly receives coverage of fire extinguishing compound. This is a particularly useful feature when large pots are on the stove which might normally prevent fire extinguishing compound from reaching the stove surface by retaining the compound within the pots.

As seen from the foregoing description, the fire extinguishing apparatus of the present invention has a combination of unique structures which provide considerable advantage over previously known fire extinguishing systems. The invention includes a compact structure which does not detract from the appearance of the stove as well as a system which is easily installed by one without particular electrical skills.

It is to be understood that the form of the invention herewith shown and described is to be taken as a preferred example of the same and that various changes in the shape, size, material, arrangement and assembly of parts may be resorted to without departing from the spirit of the invention or scope of the subjoined claims.

I claim:

1. A fire extinguishing apparatus used in conjunction with a stove which utilizes electricity and/or gas as an energy source and has a hood placed above the stove's burner surface comprising:

A. a means for expelling fire extinguishing compound onto the surface of the stove;

B. at least one shutoff means for disconnecting the energy source for operating said stove; and C. a heat activated triggering means for activating the shutoff means and said means for expelling fire extinguishing compound in the event of a fire;

wherein the stove has a plug with male prongs which is placed in an electrical outlet with female receptors for receiving electric energy and wherein said shutoff means comprises:

a. a trap door for covering the electric outlet, said trap door having a rigid outer perimeter defining a plane, and a screen extending across said plane defined by said outer perimeter, said screen having apertures therein for allowing said male prongs to pass therethrough and be received in the female receptors of the electrical outlet;

b. a frame structure attached adjacent said outlet, said trap door being hingedly connected thereto such that said trap door when in a closed position covers the front of said outlet;

c. at least one tension spring having two ends with one end connected to said frame and said other end connected to said trap door such trap said trap is biased to an open position away from the front of said outlet;

d. a latch for maintaining said trap door in a closed position over the front of said outlet; and e. a release means activated by said triggering means for releasing said latch in the event of a fire thereby allowing said trap door to move away from the outlet and pulling the male prongs from the female receptors of the electrical outlets.

2. An apparatus as defined in claim 1 whereby said latch is a rod shaped and is hingedly connected at one end to said frame and said release means is comprised of a tension cable attached to the other end of said latch, said tension cable holding said latch in communication with said trap door until the tension is released by activation of said triggering means.

3. An apparatus as defined in claim 1, wherein the stove has a gas line for delivering gas to the stove burners where said shut off means comprises:

(a) a gas valve connected to said gas line for shutting off gas, said gas valve having a valve stem extending therefrom, the gas being turned on and shut off by rotation of said valve stem;

(b) a spring loaded spool having an aperture for receiving said valve stem therein;

(c) a stationary casing mounted over said gas valve for receiving said spring loaded spool and providing a base therefore such that said spool may be turned within said casing so that potential energy spool is attained;

(d) a lever connected to said spool and a release means connected to said lever for holding said lever in a selected position for maintaining said spool in a state of potential energy, and said release means being activated by said triggering means for releasing the potential energy maintained in said spool resulting in turning said valve stem and closing said gas valve; and (e) a stop means for limiting the rotation of said valve stem.

4. An apparatus as defined in claim 3, wherein said release means includes a tension cable, said cable being relaxed by the operation of said triggering means.

5. An apparatus as defined in claim 1 wherein said means for expelling fire extinguishing compound includes:

(a) a plurality of nozzles mounted in the stove hood for spraying fire extinguishing compound, wherein at least one of said nozzles is directed downwardly for spraying fire extinguishing compound directly on the stove surface and at least one of said nozzles is directed outwardly away from the stove surface; and (b) a deflection plate attached to the stove hood and angled downwardly therefrom such that said deflection plate receives fire extinguishing compound from said outwardly directed nozzle and deflects said compound downwardly onto the stove surface such that the angle of dispersion of said fire extinguishing compound deflected from said deflection plate is greater than the angle of dispersion of fire extinguishing compound expelled from said downwardly directed nozzles.

6. A fire extinguishing apparatus use in conjunction with a stove having an electrical or gas fuel supply comprising:

(a) a means for expelling fire extinguishing compound onto the surface of a stove whereby said expulsion emits a sound pressure wave;

(b) a heat activated triggering means for activating said fire extinguishing compound expulsion; and (c) a shut-off means for disconnecting the fuel source to the stove's said shut-off means being activated by the emission of the sound pressure wave.

7. An apparatus as defined in claim 6, wherein said shut off means includes an alarm, said alarm being activated by emission of said sound pressure wave.

8. An apparatus as defined in claim 6 whereby said shut off means includes a means for translating said sound wave into an electrical output and a relay switch for disconnecting electricity activated by said translated output.

9. A fire extinguishing apparatus as defined in claim 6 wherein the stove utilizes electric current as a fuel source and said shut off means includes a relay switch connected to said electric source.

10. A fire extinguishing apparatus as defined in claim 6 wherein the stove utilizes gas as a fuel source and said shut off means includes a solenoid valve connected to said gas source.

* * * * *